(12) United States Patent
Van Seventer

(10) Patent No.: US 11,491,861 B2
(45) Date of Patent: Nov. 8, 2022

(54) IN-WHEEL ELECTRIC MOTOR PROVIDED WITH A CONTROL SYSTEM

(71) Applicant: E-TRACTION EUROPE B.V., Apeldoorn (NL)

(72) Inventor: Timothy Van Seventer, Apeldoorn (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 320 days.

(21) Appl. No.: 16/632,697

(22) PCT Filed: Jul. 20, 2018

(86) PCT No.: PCT/NL2018/050507
§ 371 (c)(1),
(2) Date: Jan. 21, 2020

(87) PCT Pub. No.: WO2019/017791
PCT Pub. Date: Jan. 24, 2019

(65) Prior Publication Data
US 2020/0290450 A1   Sep. 17, 2020

(30) Foreign Application Priority Data
Jul. 20, 2017 (NL) ..................... 2019303

(51) Int. Cl.
*B60K 7/00* (2006.01)
*H02K 11/33* (2016.01)
(Continued)

(52) U.S. Cl.
CPC ............ *B60K 7/0007* (2013.01); *H02K 11/33* (2016.01); *H02K 29/06* (2013.01); *H02K 1/187* (2013.01)

(58) Field of Classification Search
CPC ....... B60K 7/0007; H02K 11/33; H02K 29/06
See application file for complete search history.

(56) References Cited

U.S. PATENT DOCUMENTS

| 6,731,032 B1 | 5/2004 | Muszynski |
| 2009/0315433 A1 | 12/2009 | Siraky |

(Continued)

FOREIGN PATENT DOCUMENTS

| CN | 202952812 U | 5/2013 |
| CN | 106340995 A | 1/2017 |

(Continued)

OTHER PUBLICATIONS

Office Action issued in Japanese Patent Application No. 2020-502634 dated Jun. 7, 2022.

*Primary Examiner* — James A English
*Assistant Examiner* — James J Triggs
(74) *Attorney, Agent, or Firm* — Nixon & Vanderhye

(57) ABSTRACT

An in-wheel electric motor includes at a vehicle side a connector stub, a stator body connected to the connector stub and on an outer surface equipped with stator windings, and further includes a rotor body coaxially enclosing the stator and rotatable around a rotation axis. The electric motor further includes a power electronics device for powering the stator and a detector for an angular position of the rotor body relative to the stator. The connector stub is provided with a support for coupling to the power electronics device which is mounted on the support inside the hollow stator body. The detector includes an angular position sensor mounted inside the hollow stator body and coupled to the rotor body wherein the detector is mounted on the power electronics device coaxially with the rotation axis.

19 Claims, 6 Drawing Sheets

(51) Int. Cl.
*H02K 29/06* (2006.01)
*H02K 1/18* (2006.01)

(56) References Cited

U.S. PATENT DOCUMENTS

2014/0159468 A1    6/2014  Heinen et al.
2017/0063204 A1*  3/2017  Dumas ................... H02K 1/27

FOREIGN PATENT DOCUMENTS

| EP | 1 433 242 A1 | 6/2004 |
| EP | 1 252 034 A | 11/2004 |
| JP | H05-116546 A | 5/1993 |
| JP | H08-511490 A | 12/1996 |
| JP | 2003-520733 A | 7/2003 |
| WO | 01/054939 A2 | 8/2001 |
| WO | 03/030336 A1 | 4/2003 |
| WO | 2006/102609 A2 | 9/2006 |
| WO | 2013/025096 A1 | 2/2013 |
| WO | 2014/207637 A1 | 12/2014 |

* cited by examiner

IN-WHEEL ELECTRIC MOTOR PROVIDED WITH A CONTROL SYSTEM

FIELD OF THE INVENTION

The present invention relates to an in-wheel electric motor provided with a control system. Also, the invention relates to method of manufacturing such an in-wheel electric motor. Furthermore, the invention relates to a drive assembly for a wheel of a vehicle comprising such an electric motor.

BACKGROUND

Such an in-wheel electric motor is known from WO 2013/025096 that describes an electric vehicle with an in-wheel electric motor in which the rotor is coupled to a rim of the wheel carrying one or more tyres. The stator is mounted on the frame of the vehicle via a wheel suspension system. The known in-wheel motor is part of a direct drive wheel in which the electromagnets of the motor directly drive the rim and the tyre without any intermediate gears. In this manner, weight and space are saved and the number of components in the drive assembly is minimized.

The torque that is generated by the in-wheel motor depends on the flux-carrying surface between the rotor and the stator and is a quadratic function of the rotor radius. The rotor magnets are placed as far outwardly as possible around the stator, to obtain a largest possible rotor radius and the motor design is optimised to minimize the gap between the rotor and the stator for delivering a maximum power and torque to the tyre. The gap width between rotor and stator is on the other hand designed to be large enough to absorb mechanical impacts on the wheel during driving conditions.

The windings of the stator are powered by power electronics that are situated within the stator, which power electronics convert electrical energy from a power supply system of the vehicle, e.g. a battery pack and/or an electric generator, to an AC current that is suitable for use by the electric motor. Such power electronics typically comprise power electronics, e.g. IGBT current modules and a current regulator, such as described in EP 1 252 034. By using the power electronics to control the current and/or voltage supplied to the windings of the stator, the magnetic field vector of the flux generated by the stator is controlled and the electric motor is operated at the desired torque and/or speed of rotation. By integrating the power electronics within the stator, the length of bus bars which run from the power electronics to the electromagnets can remain short, which is highly desirable in view of minimizing losses of the high electrical currents and voltages generally required for operating such an electric motor, which may for instance amount to 300 A at 700V or more.

The in-wheel drive assembly can be embodied as a substantially self-contained module, without any moving parts of the vehicle attached to and/or extending into the rotor. The interior space defined by the rotor is preferably substantially closed off to prevent ingress of foreign particles, such as dust and/or wear particles released by a brake system of the vehicle and/or by the road, into said interior.

The in-wheel drive assembly may be mounted on the vehicle in a variety of positions by connecting the vehicle side of the drive assembly to the vehicle frame. A rim for mounting a tire may be attached to the rotor, preferably to a substantially cylindrical outer surface of the rotor.

From EP 1 252 034 an electronic control of the in-wheel motor is known that is placed inside the stator windings and that includes power modules, current regulators and a vector generator. The vector generator comprises an encoder or resolver mounted about a central shaft and adapted for determining the angle of the rotor, and supplies a control signal to the current regulator. Operating and control electronics are accommodated within an accommodation space of a clamping member, and are sealed off from the outside world by a cover plate that is provided with a mounting flange with which the in-wheel motor is mounted to a vehicle.

In U.S. Pat. No. 6,731,032 an electric motor control for a brushless motor is shown in which a magnetic ring on a disc is mounted on the central rotor. A hall sensor measures the angular positions and via a controller drives the stator coils with a sinusoidal current wave form.

However, in the prior art in-wheel electric motor the installation of a position sensor for measuring the angular position of the rotor with respect to the stator requires some complex alignment operations since the power electronics including the position sensor is hidden inside the electric motor.

Moreover, in the prior art in-wheel electric motor detection of the angular position may be disturbed during use as the alignment of the position sensor with the wheel axis can affected by shocks and vibrations. During use, shocks and vibrations can cause that the angular position of the rotor magnets relative to the stator windings can alter, leading to misalignment which ultimately affects the timing of the magnetic field in the stator.

It is an object of the present invention to overcome or mitigate one or more of the disadvantages from the prior art.

SUMMARY OF THE INVENTION

The object is achieved by an in-wheel electric motor comprising a stator with at a vehicle side a connector stub, a cylindrical hollow stator body connected to the connector stub and on an outer surface equipped with stator windings, and further comprising a cylindrical rotor body coaxially enclosing the stator and rotatable around a rotation axis; the electric motor further comprising a power electronics device for powering the stator windings on the stator and a detector for an angular position of the rotor body relative to the stator; the connector stub being provided with a support arranged for coupling to the power electronics device; the power electronics device being mounted on the support inside the hollow stator body; the cylindrical rotor body having an cylindrical opening at a road side, the opening being coaxial with the rotation axis; the detector for the angular position comprising an angular position sensor that is mounted inside the hollow stator body and is coupled to the rotor body wherein the detector for the angular position is mounted on the power electronics device at a road side of the power electronics device and coaxially with the rotation axis. When the connector stub, stator and rotor of the in-wheel electric motor are mounted to a vehicle, the power electronics device may subsequently be mounted within the hollow stator body by inserting the power electronics device into the opening, after which the detector for angular position can conveniently be connected to the rotor from the road side of the in-wheel motor. In this manner, installation of the in-wheel motor is facilitated, and the power electronics as well as the detector for angular position may be accessed without having to detach the connector stub, stator and/or rotor from the vehicle.

In an embodiment the power electronics device comprises a casing in which power electronics comprising components, such as IGBT's, for converting electrical energy system from a power supply system of the vehicle to an AC form suitable for use by the in-wheel electric motor.

In an embodiment the detector for the angular position is mounted within the cylindrical opening of the rotor body by a mounting plate. For instance, the mounting plate may be fixed within the cylindrical opening of the rotor at the road side, with a part of the detector arranged within the cylindrical opening and connected to the mounting plate, while another part of the detector is mounted on the power electronics device.

In an embodiment wherein the mounting plate is connected to the position sensor by a pivoting axis, sometimes also denoted pivoting axle, that is substantially coaxial with the rotation axis.

In an embodiment the pivoting axis comprises a flexible rod. The flexibility of the rod provides some allowance for small misalignments in the position of the axis of rotation of the rotor relative to the stator. Such misalignments may be the result of inaccuracies during assembly of the in-wheel motor and/or due to the varying loads on the rotor, e.g. when the wheel drives across a bump in the road.

In an embodiment position sensor is equipped with a flexible coupling connecting to the pivoting axis. This also provides for some allowance for small misalignments in the position of the axis of rotation of the rotor relative to the stator. Additionally, the flexible coupling facilitates placement of the mounting plate within the cylindrical opening of the rotor at the road side.

In an embodiment the pivoting axis comprises a pair of axial elements, one axial element being connected to the position sensor, the other axial element being connected to the mounting plate, in which the axial elements at their interface are coupled by a flexible joint.

In an embodiment the mounting plate is coplanar with the cylindrical opening.

In an embodiment the flexible joint comprises, or is embodied in, a resilient material, e.g. a silicone rubber or other kind of synthetic rubber. Such a material is typically able to withstand frequent small misalignments in position of the axis of rotation of the rotor relative to the stator, and may have high fatigue endurance. The flexible joint is preferably configured to have a high stiffness in circumferential direction, e.g. such that a distance the two ends of the joint can be translated relative to each other along the longitudinal direction of the joint is smaller than a distance the two ends can be displaced relative to each other, e.g. by bending, in a direction normal to the longitudinal direction.

According to an aspect, the invention provides a power electronics device for powering an electric motor, the electric motor comprising a stator with a cylindrical hollow stator body and on an outer surface of the stator body equipped with stator windings, and comprising a cylindrical rotor body coaxially enclosing the stator, for rotation around an electric motor rotation axis; the power electronics device comprising electronic elements for supplying power to the stator windings and a detector for an angular position of the rotor body relative to the stator; the detector for the angular position comprising an angular position sensor that is mounted on the power electronics device, and is arranged for rotatingly coupling to the rotor body via a mounting plate arranged for mounting on the rotor body coaxially with the rotation axis.

The power electronics device and the detector can thus be inserted together into the hollow stator body, during which a portion of the detector that is to be connected to the rotor remains accessible from the road side. Connecting the detector to the rotor is thus facilitated. In general the mounting plate will be attached to the detector and to the rotor once the power electronics device has been mounted within the hollow stator body and the opening of the hollow stator body is substantially covered by a cover plate of the rotor at the road side.

In an embodiment the mounting plate is connected to the position sensor by a pivoting axis coaxial with the rotation axis.

In an embodiment the power electronics device comprises a casing in which the electronic elements are accommodated. The casing protects the electronic elements from outside influences. The electronic elements are preferably adapted for converting electrical energy from a power supply system of a vehicle, to an AC form suitable for use by the electric motor.

In an embodiment the power electronics device has, when mounted in the hollow stator body, a road side and a vehicle side, and the detector for the angular position is mounted at the road side of the power electronics device. This allows the detector to be conveniently connected to the rotor from the road side once the power electronics has been mounted in the hollow stator body, In an embodiment the pivoting axis comprises a pair of axial elements, one axial element being connected to the position sensor, the other axial element being connected to the mounting plate, in which the axial elements at their interface are coupled by a flexible joint.

According to an aspect, the invention provides a method for assembling a power electronics device and an angular position sensor to an in-wheel electric motor; the electric motor comprising a stator with at a vehicle side a connector stub, a cylindrical hollow stator body connected to the connector stub and on an outer surface equipped with stator windings, and further comprising a cylindrical rotor body coaxially enclosing the stator and rotatable around a rotation axis of the electric motor; the electric motor further comprising a power electronics device for powering the stator windings and a detector for an angular position of the rotor body relative to the stator; the detector for the angular position comprising an angular position sensor that is mounted on the power electronics device and is coupled to the rotor body by a plate mounted within a cylindrical opening of the rotor body, the method comprising: providing the connector stub with a support arranged for coupling to the power electronics device; providing the cylindrical rotor body with the cylindrical opening at a road side, the cylindrical opening being coaxial with the rotation axis; mounting the power electronics device on the support inside the hollow stator body through the cylindrical opening at the road side with the detector for the angular position with an angular position sensor mounted on the power electronics device; and coupling the angular position sensor to the rotor body by mounting a plate within the cylindrical opening of the rotor body and connecting the mounting plate to the position sensor via a pivoting axis coaxial with the rotation axis.

Additionally, the invention relates to a drive assembly for a wheel of a vehicle either comprising an in-wheel electric motor as described above, or an in-wheel electric motor manufactured by a method as described above wherein the rotor part and the stator part are both adapted to be arranged at least partially within the wheel.

Advantageous embodiments are further defined by the dependent claims.

BRIEF DESCRIPTION OF DRAWINGS

The invention will be explained in more detail below with reference to drawings in which illustrative embodiments thereof are shown. The drawings are intended exclusively for illustrative purposes and not as a restriction of the inventive concept.

In the drawings.

DETAILED DESCRIPTION OF EMBODIMENTS

Figure 1A:
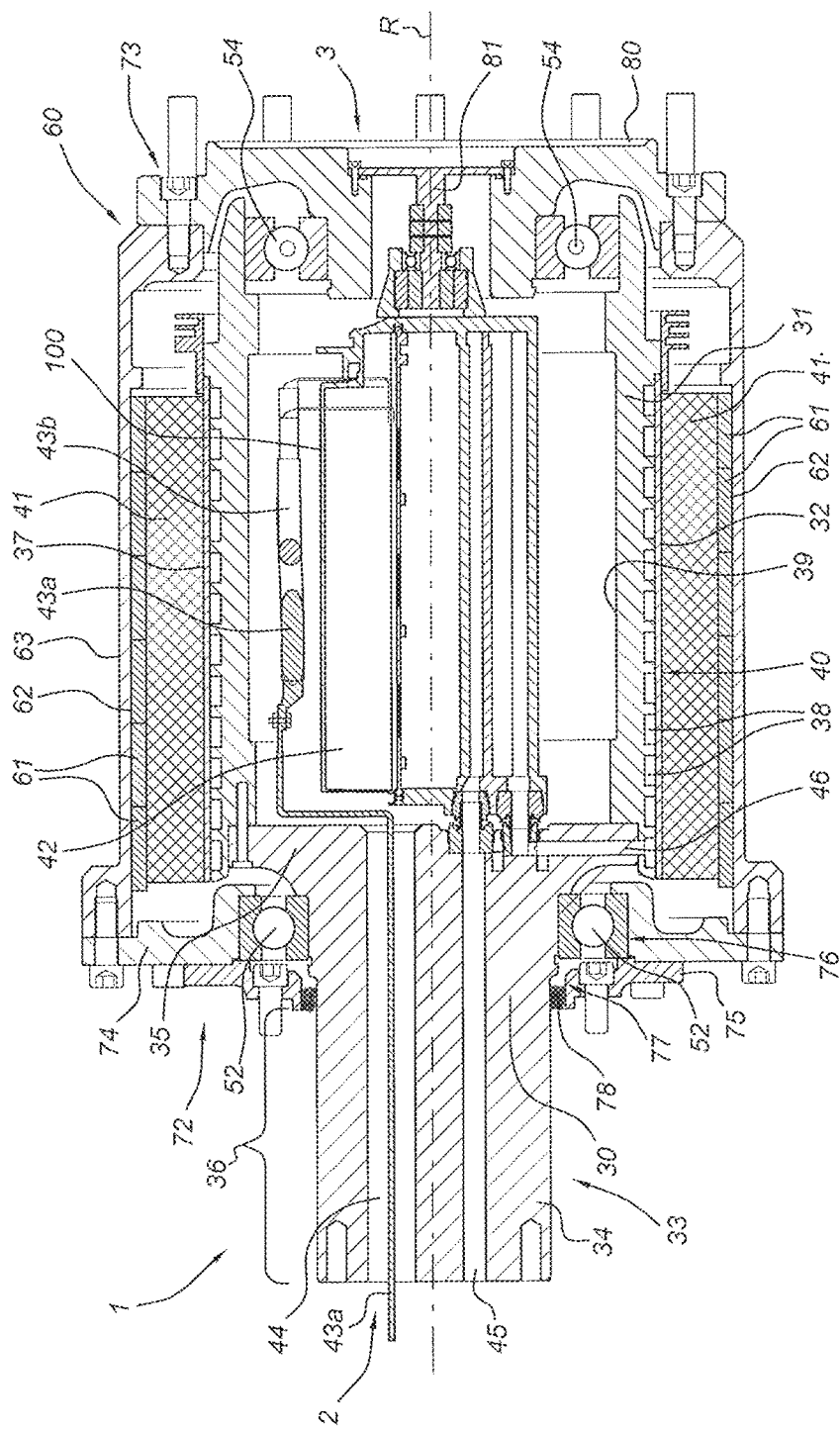
FIGS. 1A, 1B, 1C respectively show a cross-sectional view, a cut-away isometric view of a drive assembly and a cross-section of drive assembly for use with the present invention.

FIG. 1A shows a cross-sectional view of a drive assembly 1 for use with the present invention. The drive assembly comprises a stator 30 with a hollow stator body 31 which has an outer surface 32 around which a rotor 60 is arranged. The drive assembly further comprises a connector stub 33, arranged at a vehicle side 2 of the assembly 1 for attaching the drive assembly to an axle of the vehicle. The connector stub 33 is fixedly connected to the stator body 34 via a flange 35 which lies within the rotor 60 and has a larger diameter than a portion 36 of the stub 33 which lies outside the peripheral outer surface 63 of the rotor 60. For supporting rotational movement of the rotor 60 around the axis of rotation R, vehicle side bearings 52 are provided via which the rotor supported on the stub 33 on the vehicle side. On the road side 3, the rotor is rotatingly supported on the stator body 31 via road side bearings 54.

A plurality of permanent magnets 61 is attached on an inner circumferential surface 62 of the rotor 60 and can rotate around the windings of electromagnets 41 of the stator 30. The electromagnets 41 are fixed on the stator body 31 and drive rotation of the rotor by interaction between the permanent magnets 61 and the magnetic flux generated by the electromagnets 41. The stator 30 and rotor 60 form an electric motor adapted for directly driving rotation of a wheel around axis of rotation R.

The rotor 60 comprises a substantially cylindrical rotor body 71 which has transverse ends 72,73 respectively at its vehicle side 2 and at its road side 3. Both transverse ends 72,73 are substantially closed off in order to prevent foreign particles, such as dust and wear particles from the road or released by a braking system of the vehicle, from entering the interior of the hollow rotor 60. The vehicle side of the rotor is substantially closed off by a side plate 74 which extends transversely to the axis of rotation R and by a cover plate 75. The side plate 74 and cover plate 75 are each provided with an opening through which the portion 34 of the connector stub 33 extends. The side plate 74 supports the vehicle side bearings 52 while the cover plate 75 is attached to the side plate 74 to cover the bearings 51 at their transverse vehicle side 2 and comprises an opening 77 through which portion 34 extends. The cover plate 75, together with a shaft seal 78 which is arranged between the inner circumferential edge 79 of the opening 77 and the outer circumference of the shaft 34, prevents foreign particles from damaging the vehicle side bearings 52. Additionally, the cover plate 75 and shaft seal 78 substantially prevent such particles from entering the interior 5 of the rotor from the vehicle side 2, where the particles could interfere with the electromagnets 41.

The road side bearings 54, which are arranged at an inner side of the stator body 31, are covered on the road side 3 by a detachable second cover plate 80.

For controlling and powering the windings of the electromagnets 41, a casing 100 holding power electronics 42 is arranged within the hollow stator body 31. The power electronics 42 comprise components, such as IGBT's, for converting electrical energy from a power supply system of the vehicle, e.g. a battery pack and/or an electric generator, to an AC form suitable for use by the electric motor. A detector 81 for detecting an angular position of the rotor relative to the stator windings provides an angular position signal indicative of an angular position of the rotor to the power electronics so that the alternating current to the stator windings is supplied in phase with the magnetic field of the rotor. This will be explained in more detail with reference to FIGS. 2 and 3.

Power supply lines 43a, 43b for supplying power to the power electronics device 42 run from the exterior of the rotor 60, through passage 44, comprising a through hole, in the connector stub 33, to the power electronics.

The casing 100 of the power electronics 42 is mounted on a support embodied by the head i.e., the flange 35 of the connector stub 33. The diameter of the opening 90 in the cylindrical rotor body 71 at the road side is larger than the cross-section of the casing of the power electronics 42. The detachable second cover plate 80 that closes off the opening 90 in the cylindrical rotor body 71 at the road side allows that the power electronics 42 can be mounted by inserting the casing through the opening in the cylindrical rotor body 71 at the road side 3. Also, the detachable second cover plate 80 allows to lock the casing 100 of the power electronics device 42 in place and also to relatively easily access the power electronics 42, when needed. In the mounted position, the second cover plate is fixed to the rotor and rotates in conjunction with the rotor.

Figure 1B:
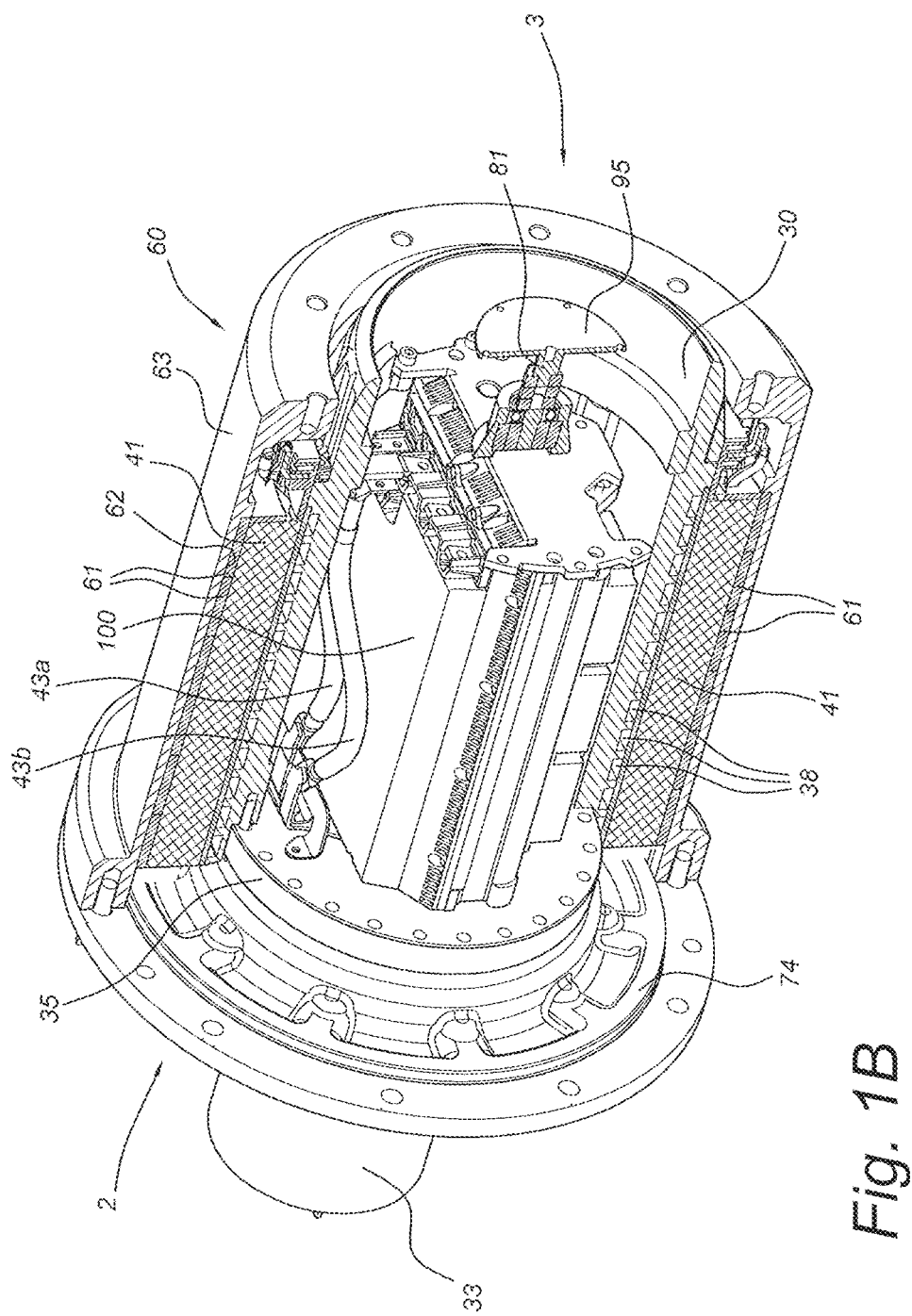

FIG. 1B shows a partially cut-away isometric view of the drive assembly of FIG. 1A, in which the second cover plate 80 and the road side bearings 54 however are not shown to allow a better view of the hollow stator body 31 and the angular position detector 81.

Figure 1C:
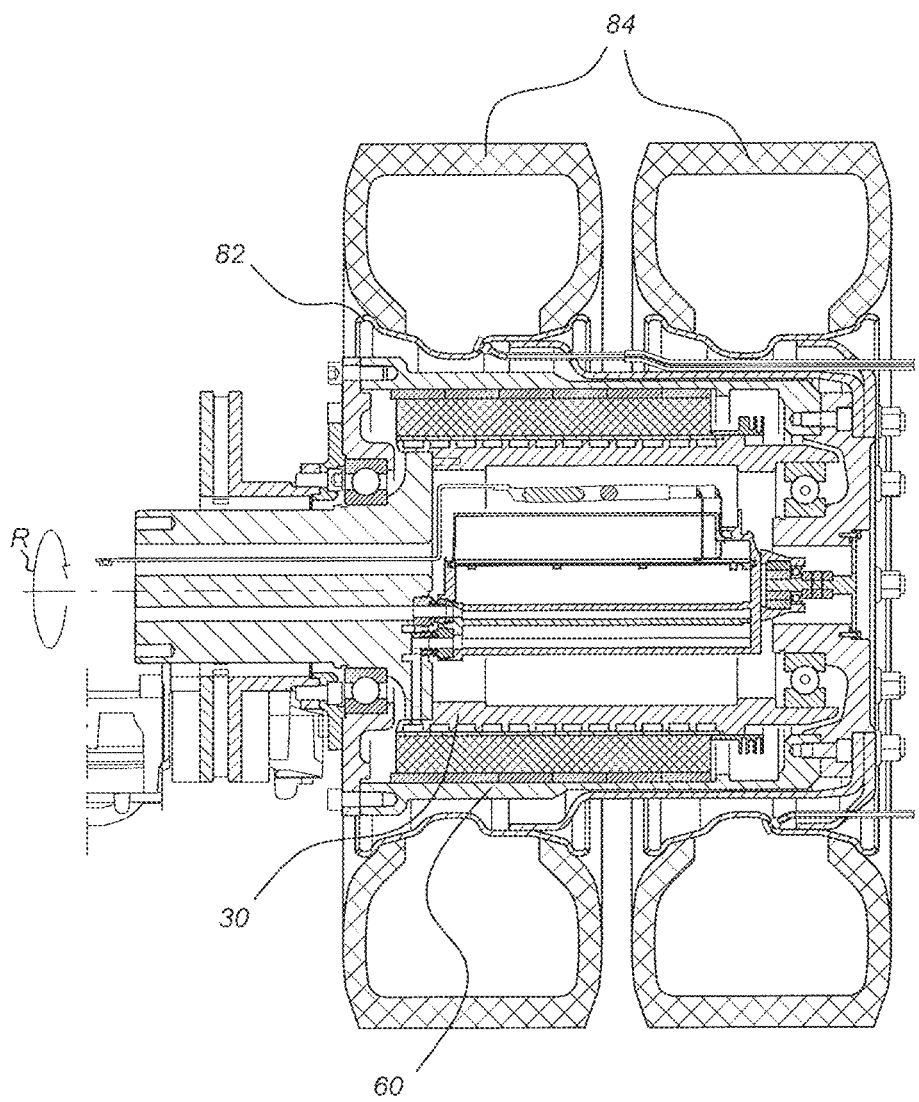

FIG. 1C shows a cross-section of a wheel drive assembly for use with the present invention. The wheel drive assembly comprises an in-wheel electric motor 4, a rim 82, and one or more tyres 84.

The in-wheel electric motor 4 comprises the stator part 30 and the rotor part 60. The stator part 30 is coupled to the connector stub 33 which is part of the chassis of a vehicle.

The rim 82 is arranged at the outer circumference of the rotor part 30. The rim 82 can be attached to the rotor part by a bolted connection as known in the prior art.

On the rim 82, one or more tyres 84 are mounted. The rotor part 60 and the stator part 30 are both arranged at least partially within the wheel.

Figure 2:
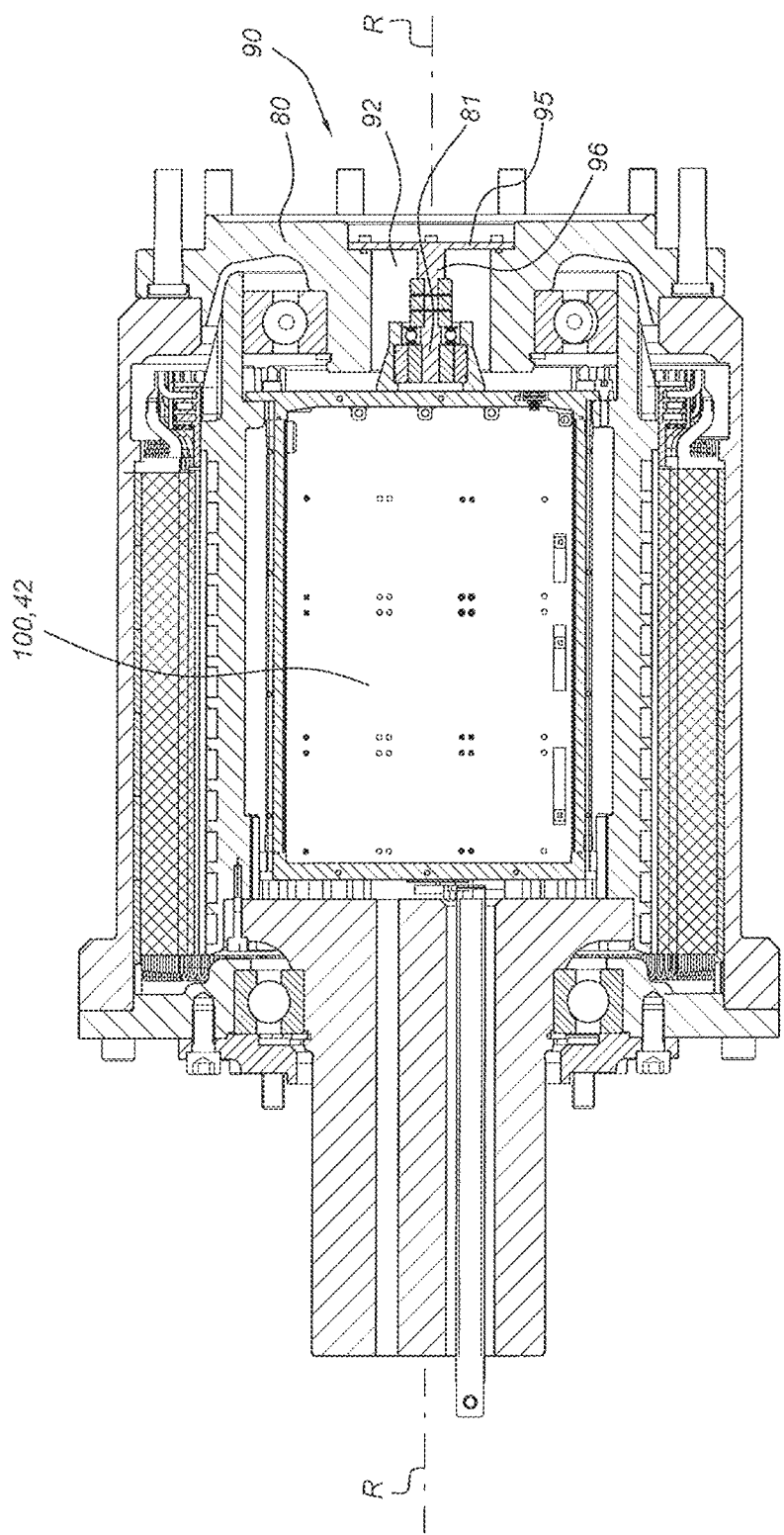
FIG. 2 shows a detailed cross-section view of an in-wheel electric motor in accordance with an embodiment of the invention.
Figure 3:
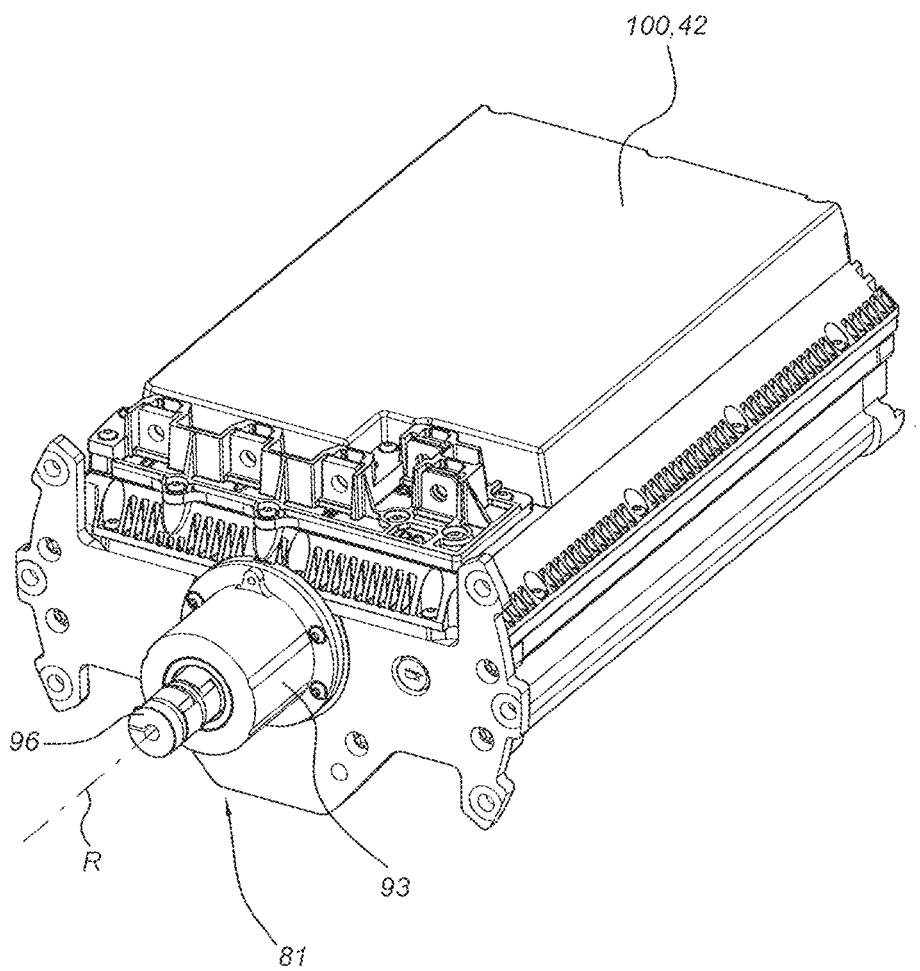
FIG. 3 shows a detailed perspective view of a casing of a power electronics device in accordance with an embodiment of the invention and FIG. 4 shows a cross-section of a coupling between the axial sensor and the rotor body, in accordance with an embodiment of the invention.

FIGS. 2 and 3 show details of the angular position sensor 81 in a cross-sectional view and a perspective view, respectively.

In the detachable second cover plate a circular opening 92 is provided that is coaxial with the rotation axis R.

The angular position detector 81 is provided for measuring the angular position of the rotor 30 relative to the stator 60, i.e. the position of the stator windings.

The angular position detector comprises an angular position sensor 93 and a transmission device 94. The angular position sensor 93 is mounted on the casing 100 of the power electronics 42 that is in a fixed position within the hollow stator body 31. Electrical connections (not shown) are provided between the angular position sensor 93 and controller electronics (not shown) within the power electronics device 42.

The transmission device 94 is adapted to provide a rotatable connection between the angular position sensor 93 at the stator side and the rotor 30.

The transmission device 94 comprises a mounting plate 95 and a transmission axis 96. The mounting plate 95 is adapted to be mounted in the circular opening 92 of the detachable second cover plate 80. The transmission axis 96 is a pivoting axis that rotatingly connects the mounting plate 95 to the angular position sensor 93. The pivoting axis is positioned coaxially with the rotation axis R of the in-wheel electric motor 4. In this manner, rotation of the rotor 60 is transmitted to the angular position sensor 93 through the connection of the pivoting axis 96 and the mounting plate 95 attached to the second cover plate 80 of the rotor.

In a further embodiment, the pivoting axis 96 is arranged as a flexible axis element, for example an axis element made from a resilient material.

Flexibility or resilience of the pivoting axis 96 allows to absorb or cushion shocks or vibrations originating from the side 3 of the rotor 60 and to prevent propagation of these shocks or vibrations to the angular position sensor 93 and/or (the casing 100 of) the power electronics 42. Due to stiffness in the circumferential direction, the flexible axis 96 of the angular position detector 81 maintains an accurate transmission of the rotations even if the flexible axis 96 of the detector 81 is not exactly aligned with the wheel axis of rotation R.

Figure 4:
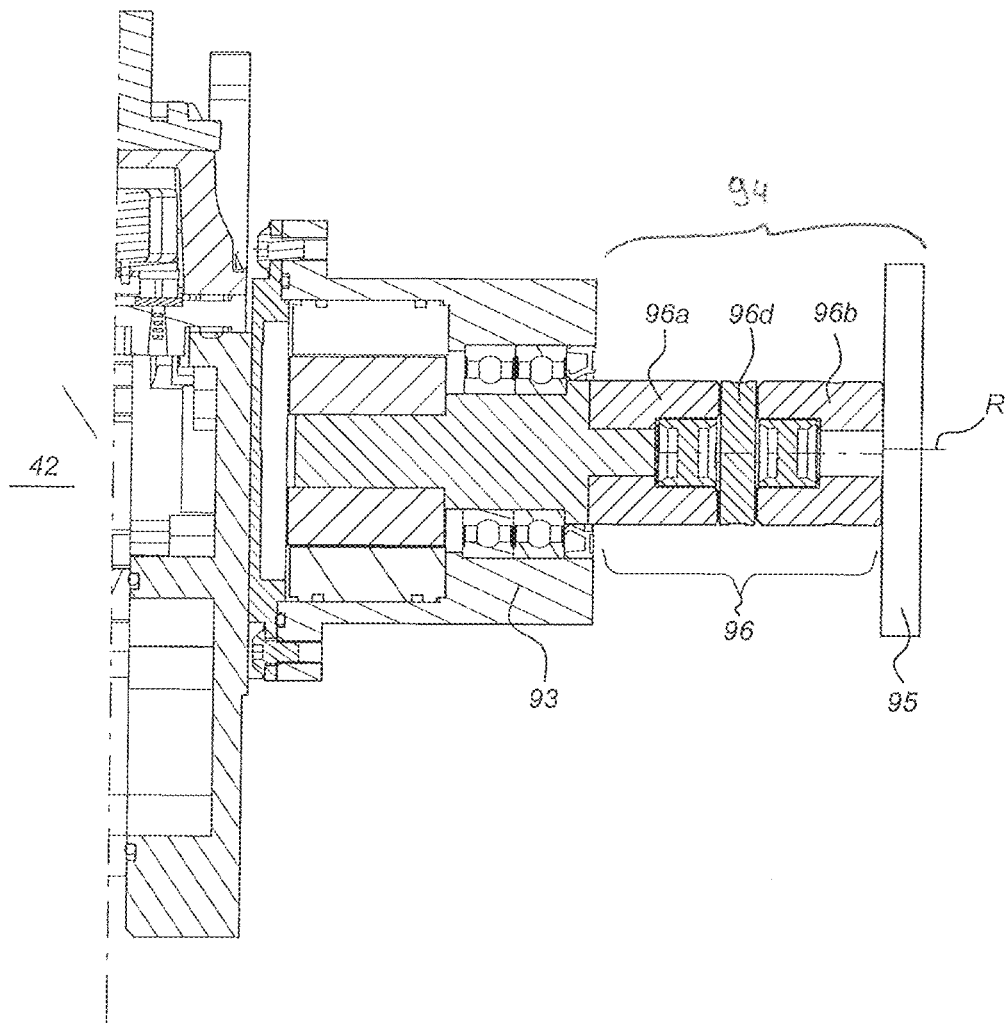

FIG. 4 shows a cross-section of a coupling between the angular position sensor 93 and the rotor body. The coupling comprises the transmission axis (pivoting axis) 96 that comprises a pair of axial elements 96A, 96B. One axial element 96A is proximal to the angular position sensor and connects to the rotating axis of the angular position sensor. The other axial element 96B is distal from the angular position sensor and connects to the mounting plate 95 that is coupled to the rotor body.

The two axial elements 96A, 96B are connected to each other at their interface 96C. On the interface 96C, a resilient joint 96D is provided which is flexible in the direction of the transmission axis and allows bending of the transmission axis in case of a misalignment of the rotation axis of the one axial element 96A and the rotation axis of the other axial element 96B. By its resilience, the resilient joint 96D can compensate for bending due to shocks and vibrations during operation. Along the circumferential direction, the resilient joint 96D is configured to have a high stiffness, so as to have a transfer of the rotation between the axial elements substantially undisturbed by variations due to shocks or vibrations generated by the wheel.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims.

The invention claimed is:

1. An in-wheel electric motor comprising:
a stator with
at a vehicle side, a connector stub,
a cylindrical hollow stator body connected to the connector stub, and
on an outer surface, equipped with stator windings;
a cylindrical rotor body coaxially enclosing the stator and rotatable around a rotation axis;
a power electronics device configured to power the stator windings on the stator; and
a detector to detect an angular position of the rotor body relative to the stator,
wherein the connector stub is provided with a support configured to couple to the power electronics device,
the power electronics device is mounted on the support inside the hollow stator body,
the cylindrical rotor body has an cylindrical opening at a road side, the opening being coaxial with the rotation axis, and
the detector comprises an angular position sensor that is mounted inside the hollow stator body and is coupled to the rotor body, the detector being mounted on the power electronics device at a road side of the power electronics device and coaxially with the rotation axis.

2. The in-wheel electric motor according to claim 1, wherein the detector is mounted within the cylindrical opening of the rotor body by a mounting plate.

3. The in-wheel electric motor according to claim 2, wherein the mounting plate is connected to the position sensor by a pivoting axis coaxial with the rotation axis.

4. The in-wheel electric motor according to claim 3, wherein the pivoting axis comprises a flexible rod.

5. The in-wheel electric motor according to claim 3, wherein the position sensor is equipped with a flexible coupling connecting to the pivoting axis.

6. The in-wheel electric motor according to claim 5, wherein the pivoting axis comprises a pair of axial elements, one of the axial elements being connected to the position sensor, the other of the axial elements being connected to the mounting plate, the axial elements, at their interface, are coupled by a flexible joint.

7. The in-wheel electric motor according to claim 1, wherein the mounting plate is coplanar with the cylindrical opening.

8. The in-wheel electric motor according to claim 6, wherein the flexible joint is embodied in a resilient material.

9. The in-wheel electric motor according to claim 8, wherein the flexible joint is configured to have a high stiffness in circumferential direction.

10. A power electronics device to power an electric motor including a stator and a cylindrical rotor body coaxially enclosing the stator, for rotation around a rotation axis of the electric motor, the stator having a cylindrical hollow stator body and equipped with stator windings on an outer surface thereof, the power electronics device comprising:
a plurality of electronic elements configured to supply power to the stator windings; and
a detector configured to detect an angular position of the rotor body relative to the stator, the detector comprising an angular position sensor that is mounted on the power electronics device, the position sensor being configured to rotatingly couple to the rotor body via a mounting plate configured to mount on the rotor body coaxially with the rotation axis,
wherein, when the power electronics device is mounted in the hollow stator body, the power electronic device has a road side and a vehicle side, the detector being mounted at the road side of the power electronics device.

11. The power electronics device according to claim 10, wherein the mounting plate is connected to the position sensor by a pivoting axis (96) coaxial with the rotation axis.

12. The power electronics device according to claim 10, further comprising a casing in which the electronic elements are accommodated.

13. The power electronics device according to claim 11, wherein the pivoting axis comprises a pair of axial elements, one of the axial elements being connected to the position sensor, the other of the axial elements being connected to the mounting plate, the axial elements, at their interface, are coupled by a flexible joint.

14. A method for assembling a power electronics device and an angular position sensor to an in-wheel electric motor including a stator with at a vehicle side a connector stub a cylindrical hollow stator body (31) connected to the connector stub, and on an outer surface equipped with stator windings, the electric motor including a cylindrical rotor body coaxially enclosing the stator and being rotatable around a rotation axis of the electric motor, the electric motor including a power electronics device configured to power the stator windings and a detector configured to detect an angular position of the rotor body relative to the stator, the detector including an angular position sensor that is mounted on the power electronics device and is coupled to the rotor body by a plate mounted within a cylindrical opening of the rotor body, the method comprising:
  providing the connector stub with a support extending into the hollow stator body, configured to couple to the power electronics device;
  providing the cylindrical rotor body with the cylindrical opening at a road side, the cylindrical opening being coaxial with the rotation axis;
  mounting the power electronics device on the support inside the hollow stator body through the cylindrical opening at the road side with the detector for the angular position with an angular position sensor mounted on the power electronics device; and
  coupling the angular position sensor to the rotor body by mounting a plate within the cylindrical opening of the rotor body and connecting the mounting plate to the position sensor via a pivoting axis coaxial with the rotation axis.

15. A drive assembly for a wheel of a vehicle, the drive assembly comprising:
  the in-wheel electric motor according to claim 1, the stator and the cylindrical rotor body being coaxial with respect to the rotation axis,
  wherein the cylindrical rotor body and the stator are both configured to be disposed at least partially within the wheel.

16. A drive assembly (1) for a wheel of a vehicle, the drive assembly comprising:
  the in-wheel electric motor according to claim 10, the stator and the cylindrical rotor body being coaxial with respect to the rotation axis 4R*,
  wherein the cylindrical rotor body and the stator are both configured to be disposed at least partially within the wheel.

17. A drive assembly for a wheel of a vehicle, the drive assembly comprising:
  the in-wheel electric motor (4) manufactured in accordance with the method of claim 14,
  wherein the cylindrical rotor body and the stator are both configured to be disposed at least partially within the wheel.

18. The in-wheel electric motor according to claim 2, wherein the mounting plate is coplanar with the cylindrical opening.

19. The in-wheel electric motor according to claim 3, wherein the mounting plate is coplanar with the cylindrical opening.

* * * * *